(12) United States Patent
Anderson

(10) Patent No.: US 9,558,128 B2
(45) Date of Patent: Jan. 31, 2017

(54) SELECTIVE MANAGEMENT OF SECURITY DATA

(71) Applicant: Seagate Technology LLC, Cupertino, CA (US)

(72) Inventor: William Erik Anderson, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 54 days.

(21) Appl. No.: 14/529,642

(22) Filed: Oct. 31, 2014

(65) Prior Publication Data

US 2016/0117266 A1   Apr. 28, 2016

Related U.S. Application Data

(63) Continuation-in-part of application No. 14/524,823, filed on Oct. 27, 2014.

(51) Int. Cl.
*H04L 29/06*  (2006.01)
*G06F 12/14*  (2006.01)

(52) U.S. Cl.
CPC ... *G06F 12/1416* (2013.01); *G06F 2212/1052* (2013.01)

(58) Field of Classification Search
CPC ............... G06F 12/1416; G06F 2212/1052; G06F 21/78
See application file for complete search history.

(56) References Cited

U.S. PATENT DOCUMENTS

| | | | |
|---|---|---|---|
| 5,608,801 A | 3/1997 | Aiello et al. | |
| 6,182,222 B1 | 1/2001 | Oparaji | |
| 7,653,197 B2 | 1/2010 | Van Dijk | |
| 7,933,905 B2 | 4/2011 | Obana et al. | |
| 8,037,518 B2 | 10/2011 | Buer | |
| 8,059,816 B2 | 11/2011 | Bai | |
| 8,397,051 B2 | 3/2013 | Beaman et al. | |
| 9,111,109 B2 * | 8/2015 | Islam | G06F 21/6218 |
| 2006/0179259 A1 * | 8/2006 | Kershaw | G06F 12/1081 711/154 |
| 2006/0218176 A1 | 9/2006 | Sun Hsu et al. | |
| 2009/0217385 A1 | 8/2009 | Teow et al. | |
| 2010/0192194 A1 * | 7/2010 | Tan | G06F 21/6218 726/1 |
| 2010/0215175 A1 | 8/2010 | Newson et al. | |

(Continued)

FOREIGN PATENT DOCUMENTS

WO   2007-036763 A1   4/2007

*Primary Examiner* — Shawnchoy Rahman
(74) *Attorney, Agent, or Firm* — Holzer Patel Drennan

(57) ABSTRACT

Security techniques may be selectively performed on data based on a classification of the data. One example technique includes receiving a memory access command specifying a target data block on a storage medium storing both security data and non-security data. The technique further includes determining whether data affected by the access command is security data. Response to such determination, one of multiple data management schemes is selected to implement the memory access command, where each of the data management schemes is adapted to implement the memory access command via a different series of processing operations to provide a different level of security protection for data affected by the memory access command.

18 Claims, 8 Drawing Sheets

(56) References Cited

U.S. PATENT DOCUMENTS

| | | |
|---|---|---|
| 2010/0218037 A1 | 8/2010 | Swartz et al. |
| 2013/0124785 A1* | 5/2013 | Xiong ................ G06F 12/0246 711/103 |
| 2013/0305057 A1 | 11/2013 | Greco et al. |

* cited by examiner

SELECTIVE MANAGEMENT OF SECURITY DATA

CROSS-REFERENCE TO RELATED APPLICATIONS

This application is a continuation-in-part of U.S. patent application Ser. No. 14/524,823, entitled "Data Shredding For Storage Based Devices" and filed on Oct. 27, 2014, which is specifically incorporated by reference for all that it discloses or teaches.

BACKGROUND

As physical storage media technology changes, data management techniques for managing data also evolve. However, many existing virtual data storage systems do not lend themselves well to security data storage. For example, some data platforms do not have built-in mechanisms for ensuring secure erasure of stale data that is no longer in use. In some storage technologies, such as flash-based solid state devices (SSDs), data is constantly being moved around in memory in order to maintain wear-leveling across the device. Commonly used management techniques may permit critical security parameters to be copied and moved around without the knowledge of a host device. Having multiple unknown copies of security parameters stored on the media can present a security risk.

SUMMARY

Implementations described and claimed herein provide for selective implementation of management when reading, writing, and/or erasing data.

According to one implementation, a method includes receiving an access command specifying a target data block on a storage medium including both security data and non-security data; determining whether data affected by the memory access command is security data; and responsive to the determination operation, selecting one of multiple data management schemes to implement the data access command. Each of the multiple data management schemes is adapted to implement the memory access command via a different series of processing operations that offers a different level of security protection for the data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
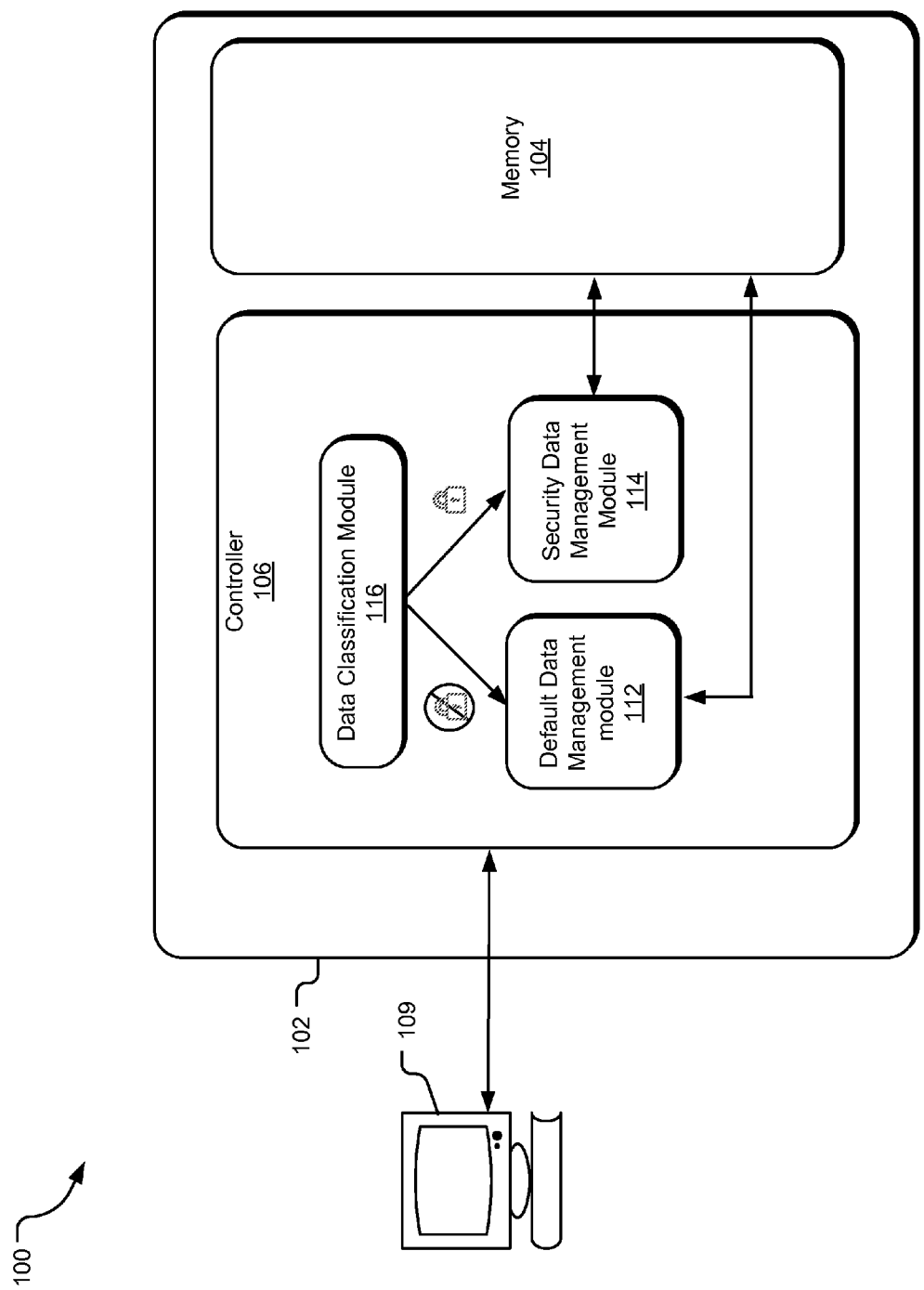
FIG. 1 illustrates an example storage system for selectively implementing two or more different data management schemes.

Virtual storage systems are storage systems that map logical addresses (LBAs) of a host device to physical data storage blocks. For example, a controller of a storage device may maintain and dynamically update one or more mapping tables indicating where each host LBA is stored on storage media. This mapping is, in some implementations, completely invisible to the host device.

As technology evolves, storage device controllers implement increasingly complex virtual data management and mapping schemes that move data around for a variety of purposes. For example, a storage device controller of a flash-based storage system may frequently move data between different flash data pages to ensure even wear-leveling, reduce read and write latencies, and/or maximize storage efficiency. However, making multiple copies of data creates challenges in ensuring that the data is completely wiped when the storage device controller executes a command to delete the data.

In an ideal data storage device, data could be securely erased by applying a single erasure operation to a memory location at which the data are stored, thereby resetting the memory to a pristine state and removing all traces of the previously programmed data. In the real world, however, a single erasure operation upon a previously programmed non-volatile memory location will almost always leave traces of the previously programmed state of the memory.

One reason why it is difficult to securely erase a non-volatile memory relates to the construction of memory itself. Rotatable magnetic recording media (e.g., magnetic discs) used in hard disc drives (HDDs) use a magnetic write field to write data to tracks. Residual magnetization patterns (From the written tacks and/or from adjacent tracks) can be detected and decoded using sophisticated laboratory techniques to recover a previously stored data set, even if multiple overwrites have taken place.

Erasable solid state memory such as flash memory arrays used in solid state drives (SSDs) store data by accumulating discrete quanta of charge on individual memory cells. An erasure operation is generally required to remove the accumulated charge to return the cells to an initial reset state. As with rotatable media, the charge signatures of previously programmed states of flash memory cells can be detected using sophisticated analysis techniques even after multiple program/erase cycles have been applied, and these charge signatures can be used to reconstruct a previously stored data set.

Another reason why it is difficult to securely erase data is that erasure mechanisms, while usually effective, are not absolutely 100% effective every time. Apart from residual signatures that may be present even if an erasure operation is successfully carried out, there is an additional (albeit small) probability at any given time that a particular erasure operation applied to a set of data will not actually alter the programmed states of the memory locations of the data.

A third reason why it is difficult to perform a secure erasure of data relates to block failures in a memory. Block failures relate to the fact that regions of memory, once written, may "fail" such that the data stored thereon cannot be successfully accessed by the data storage system. Block failures may arise due to a variety of reasons such as wear, contamination, damage, etc. Thus, at any given time, an erasure may be commanded for a particular block (e.g., track, erasure block, etc.), but due to a block failure the data storage device cannot access that block. The problem with this is that while the data storage device cannot access the block, a motivated attacker may be able to physically access the memory directly and, through a laboratory examination of the memory, determine the data state of the block.

As used herein, "successful data shredding" means that an attacking party cannot extract information about the underlying (secret) data, even when residue data exists after data is erased.

FIG. 1 illustrates an example storage system 100 for selectively applying different data management schemes. The storage system 100 includes a storage device 102 having a tangible computer-readable storage media (i.e., a memory 104), which can store data in sequential units (e.g., cells or data blocks) that are accessible by a computer. The term "tangible computer-readable storage media" includes, but is not limited to, RAM, ROM, EEPROM, solid state memory (e.g., flash memory), CDROM, digital versatile disks (DVD) or other optical disk storage, magnetic cassettes, magnetic tape, magnetic disk storage or other magnetic storage devices, or any other tangible medium which can be used to store the desired information and which can accessed by a computer. In contrast to tangible computer-readable storage media, intangible computer-readable communication signals may embody data resident in a modulated data signal, such as a carrier wave or other signal transport mechanism. In one implementation, the memory 104 is an individual, non-volatile storage medium such as an individual flash block, magnetic disc, etc. In another implementation, the memory 104 includes multiple non-volatile storage media.

The storage device 102 includes a controller 106 that is a hardware-based or programmable processor that provides top-level control of the storage device 102. The controller 106 is configured to read data from the memory 104, write data to the memory 104, control movement of a read/write head (if the storage device 102 includes a read/write head), etc. The controller 106 may initiate memory access operations either independently or responsive to a request from a host computer 109. As used herein, a 'memory access operation' is an operation that entails access to or alteration of data stored in a physical memory, such as the memory 104. There are three fundamental types of memory access operations: read operations, write operations, and erase operations.

Some data management techniques combine multiple memory access operations to achieve a desired result. For example, a garbage collection command may entail reading, writing, and erasing data. During a garbage collection command, the controller 106 moves valid data from one garbage collection unit (e.g., a flash block or collection of flash blocks) to empty pages in another garbage collection unit. After moving the valid data, the controller 106 reprograms memory cells in the original garbage collection unit to assume a different (e.g., an 'erased') memory state, freeing up the space for new data.

For one or more of the reasons discussed above, reprogramming memory cells may not always guarantee a complete removal of the data previously stored on the memory 104. Therefore, one implementation of the disclosed technology permits the controller 106 to selectively implement one or more memory access operations according to a more complex management scheme. In one implementation, this more complex data management scheme provides for secure shredding of the data at the original storage location.

When the controller 106 initiates a memory access command, the data classification module 116 determines a classification of the data that is to be affected (e.g., read, re-written, changed, or erased) by executing the memory access command. In one implementation, the data classification module 116 determines whether data affected by a memory access command is classified as "security data." As used herein, the term "security data" refers to sensitive data for which increased protection against data loss and/or unauthorized data access is desirable. In various implementations, security data may refer to critical security parameters used for secure erasure, access control state, key-wrapped media encryption keys, public and private keys of the device, etc. In contrast to security data, non-security data may refer to, for example, low-priority data, such as user data, that is not essential for the long-term health maintenance for the storage drive 102.

Based on an identified data classification (e.g., a 'security' or 'non-security' classification) the data classification module 116 selects an appropriate data management module to implement a memory access command initiated by the controller 106. In FIG. 1, the data classification module 116 selects between a default data management module 114 and a security data management module 112. Each of the default data management module 112 and the security data management module 114 are configured to implement a same type of data access operation via a different data management scheme (e.g., via a different series of processing operations). The data classification module 116 delegates execution of the memory access operation to the selected one of the default data management module 112 or the security data management module 114.

The default data management module 112 and the security data management module 114 can take on a variety of forms, including hardware, software, and/or firmware. For example, at least certain operations of any of the illustrated modules can be realized using programming steps stored in a suitable memory and accessed by a programmable processor. Alternatively, one or more of the illustrated modules may be realized using hardware, a specially configured system on chip (SOC) integrated circuit device incorporated into read/write channel circuitry, etc.

Some implementations of the disclosed technology include more than two data management modules. For example, the data classification module 116 may select between three or more different security data management modules that implement different levels of secure data handling (e.g., data integrity, encryption, etc.) based on a classifications or characteristics of the affected data. For example, operations relating to data classified as "low security" may be managed by a first data management module (e.g., the default data management module 112); operations relating to data classified as "medium security" may be managed by a second management module (e.g., the security data management module 114); and operations relating to data classified as "high security" may be managed by a third data management module (not shown).

In FIG. 1, the default data management module 112 executes memory access operations that affect data classified as non-security data. According to one implementation, the default data management module 112 implements read, write, and erase operations according to a nominal data management scheme that provides a baseline level of redundancy, security protection, etc.

Compared to the default data management module 112, the security data management module 114 may have tighter control over the physical mapping of data, how data is copied, moved, garbage collected, etc. In general, the security data management module 114 implements non-nominal write, read and erase operations.

One example of a non-nominal write operation is a secure write operation that encrypts data according to a different encryption scheme (e.g., type of encryption and/or protection level) than a nominal write operation. For example, the security data management module 114 may write data to the memory 104 using an error correction/block erasure codes that provides increased reliability as compared to an error correction code/block erasure code implemented by the default data management module 112. In the same or another implementation, the security data management module 112 writes the data with an increased redundancy as compared to a redundancy implemented by the default data management module 112.

One example of a non-nominal read operation is a secure read operation that decrypts data according to a different decryption scheme than a nominal read operation; an example non-nominal erase operation is a secure erase operation that entails one or more processing operations in addition to or in lieu of those operations performed in a nominal erase operation of non-security data.

In one implementation, the default data management module 112 and the security data management module 114 are both configured to manage (e.g., read, write, erase) data on a same storage medium (e.g., the memory 104). For example, the memory 104 may be a solid state data block or a magnetic disk that stores both security data and non-security data. In one implementation, the memory 104 is a magnetic drive configured to receive data via a shingled magnetic recording scheme. In other implementations, the memory 104 includes multiple individual storage media of the same or different types.

Figure 2:
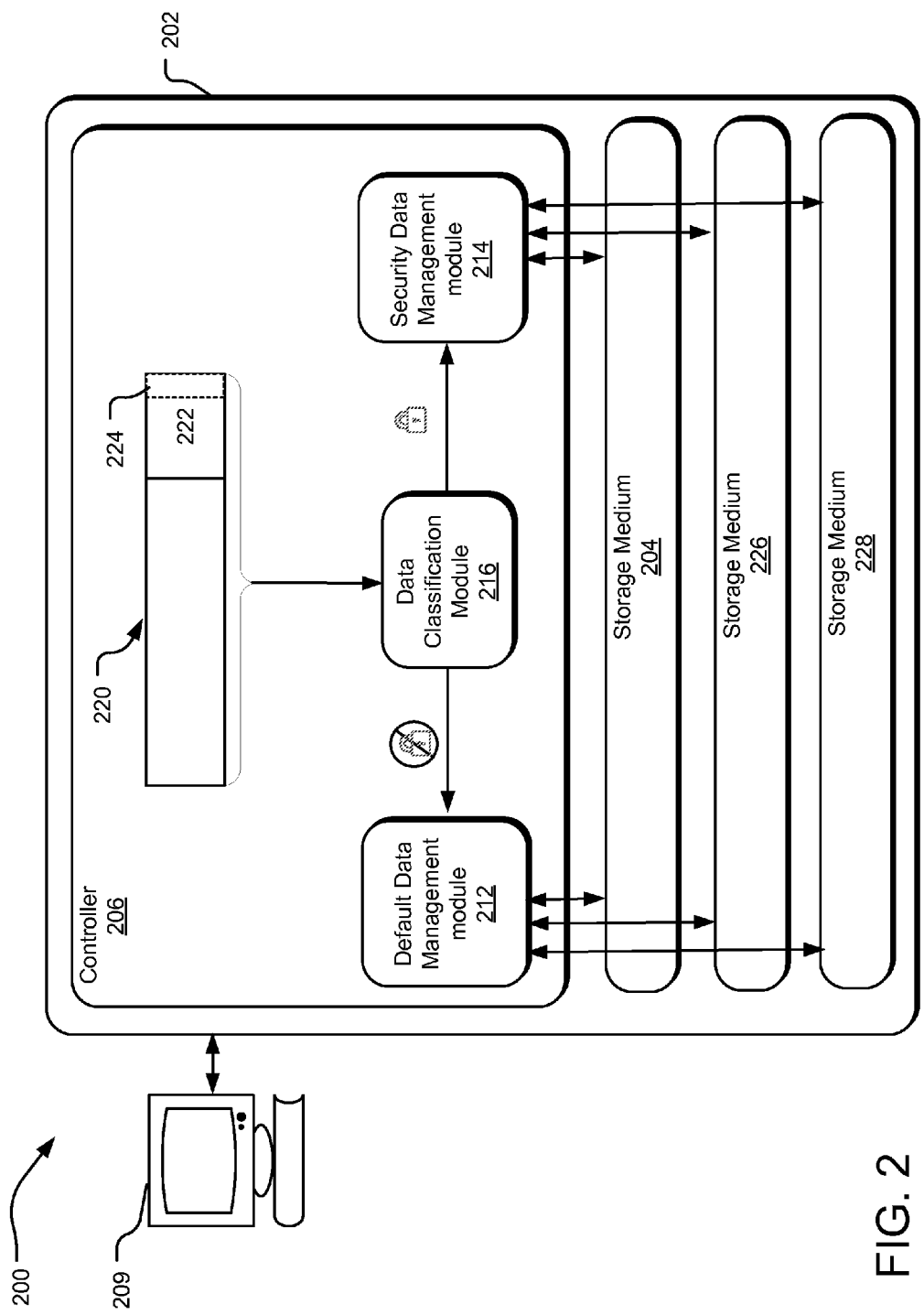
FIG. 2 illustrates another example storage system for selectively implementing two or more different data management schemes.

FIG. 2 illustrates another example system 200 for selectively implementing two or more different data management schemes. The system includes a host computer 209 that sends memory access commands (e.g., read, write, and erase commands) to a controller 206 of the storage device 202. The controller 206 executes the access commands from the host 209 and also initiates and executes memory access commands independent of the host 209.

The controller 206 includes a data classification module 216 that delegates execution of memory access commands to either a default data management module 212 or a security data management module 214 based on a classification of data that is to be affected by each memory access command. In FIG. 2, the security data management module 214 is internal to the storage device 202 and not accessible by the host 209. For example, all security data may be managed internal to a secure system area that is not addressable by the host 209. In other implementations, however, the security data management module 214 may be able to receive and implement some host API calls, such as a request for a secure shredding of data stored within the storage device.

In an example write operation illustrated in FIG. 2, the controller 206 initiates a write operation of a data packet 220 to a target memory location. The data packet 220 includes a header 222, and the header 222 further includes a data type identifier 224 indicating whether data of the data packet 220 is classified as security data. The data classification module 216 reads the data type identifier 224 and delegates execution of the access command to one of the two different data management modules based on the data type identifier 224.

In one implementation, the data type identifier 224 is a single bit flag or collection of bit flags included in the header 222. In another implementation, the data packet 220 does not include the data type identifier 224 in the header 222. Rather, the data classification module 216 determines the data type identifier 224 based on a target memory location (e.g., an LBA) of the data packet 220. For example, security data may be stored and managed within a first LBA range on a storage medium 204 and non-security data may be stored and managed within a second LBA range on the storage medium 204.

The example storage device 202 includes three separate storage media 204, 226, and 228. Other implementations may include few or greater than three storage media. In one implementation, the separate storage media 204, 226, and 228 are different disks within a hard drive assembly (HDA). In another implementation, one or more of the separate storage media is a solid state memory device. For example, the storage media 204, 226, and 228 may include any combination of NAND, NOR, magnetic media, etc.

On any individual storage medium, data can be managed according to two or more different data management schemes that each entail different processing operations for a same type of memory access operation. For example, the default data management module 212 may implement nominal memory access operations (e.g., read, write erase) while the security data management module implements non-nominal memory access operations (e.g., secure read, secure write, secure erase).

In some implementations, the data classification module 216 may delegate execution of a memory access command to an appropriate data management module (e.g., the security data management module 214 or the default data management module 212) based on which of the storage media 204, 226, and 228 includes target data blocks associated with the memory access command. For example, the storage medium 204 may store user data and some types of security data with a low level of security protection; the storage medium 226 may store other types of security data with a moderate level of security protection; and the storage medium 228 may store still other types of security data with a high level of protection. Different data management modules may provide the various levels of security protection associated with each different storage media. For example, a secure erase command may be optimized for each media type based on the block failure rate and/or bit erasure rates of the media type.

Figure 3:
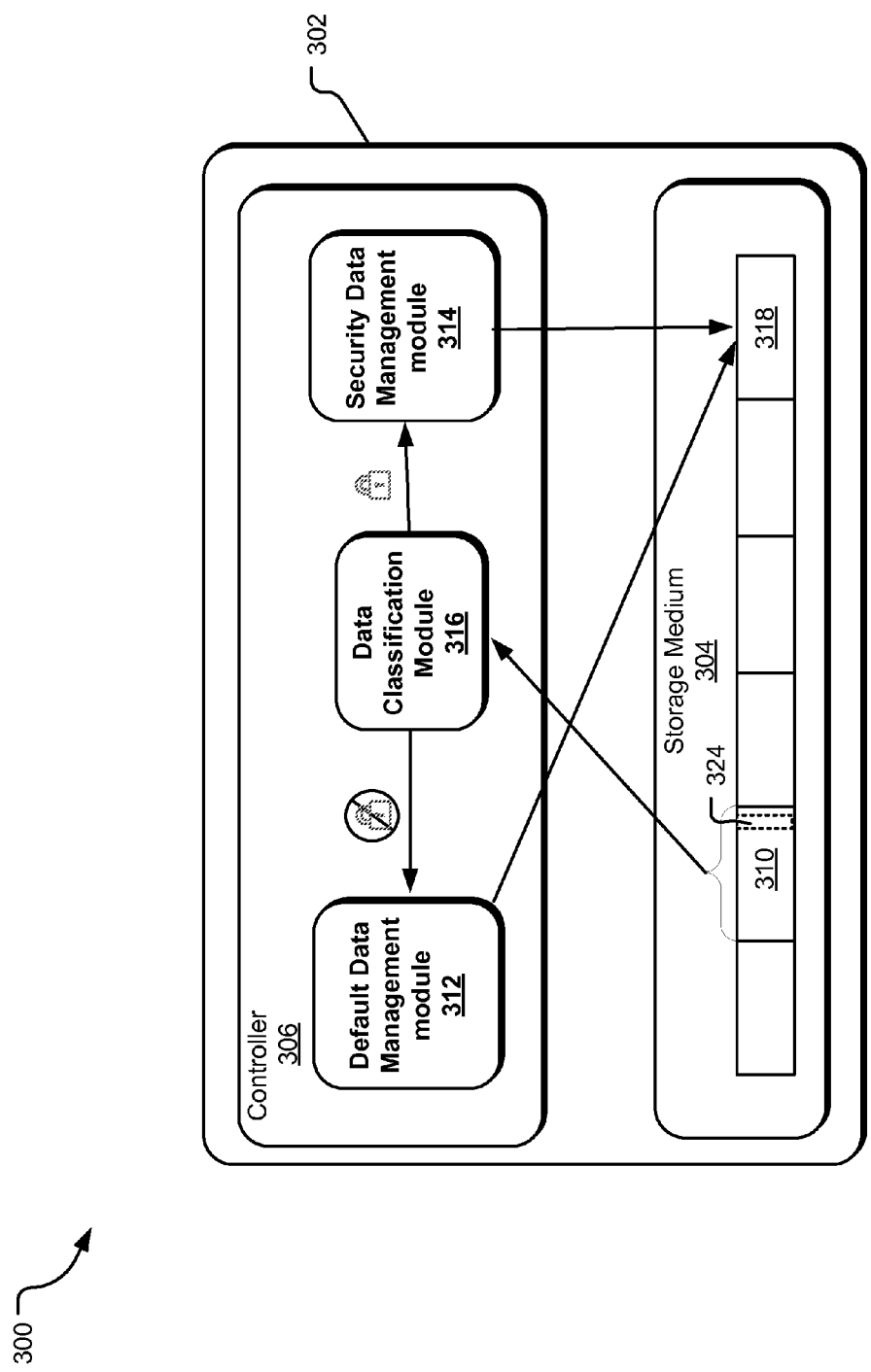
FIG. 3 illustrates another example storage system for selectively implementing two or more different data management schemes while moving data from one storage location to another within a storage device.

In some implementations, the host computer 209 or the controller 208 may initiate a write command as part of a data moving or copying (e.g., garbage collection) operation. In such a situation, the data to be moved or copied is already saved in a specified storage location in the storage medium 204. One such implementation illustrated by FIG. 3. In particular, FIG. 3 illustrates selective implementation of one or more data management schemes while moving data from one storage location to another within a storage device 302.

A controller 306 of the storage device 302 initiates a series of memory access commands either independently or responsive to instruction from a host (not shown). The series of access commands includes at least a read command for reading a data of a first data block 310 of a storage medium 304 and a write command for writing the data to a second data block 318 on the storage medium 304.

The controller 306 reads data from the first data block 310 of the storage medium 304, and a data classification module 316 of the controller 306 identifies whether the data of the first data block includes security data based on a data type identifier (e.g., a data type identifier 324) associated with data of the first data block 310. In FIG. 3, the data type identifier 324 is stored within the first data block 310. For example, the data type identifier may be a flag stored in a header portion of the data block 310. In another implementation, the data type identifier 324 is not stored on the storage medium 304 but is instead determined by the data classification module 316 based on an LBA location of the first data block 310 and/or the second data block 318.

If the data type identifier 324 indicates that the data is not security data, the data classification module 316 delegates a re-write of the data read from the first data block 310 to a default data management module 312. If, on the other hand, the data type identifier 324 indicates that the read data is security data, the data classification module 316 delegates the re-write of the data read from the first data block 310 to a security data management module 314. In one implementation, the default data management module 312 writes the data according to a write process that entails fewer operations that another write process (e.g., a secure write) performed by the security data management module 314. For example, writing of the data to the block 318 by the security data management module 314 may include a secure shred of data from the first data block 310.

Figure 4:
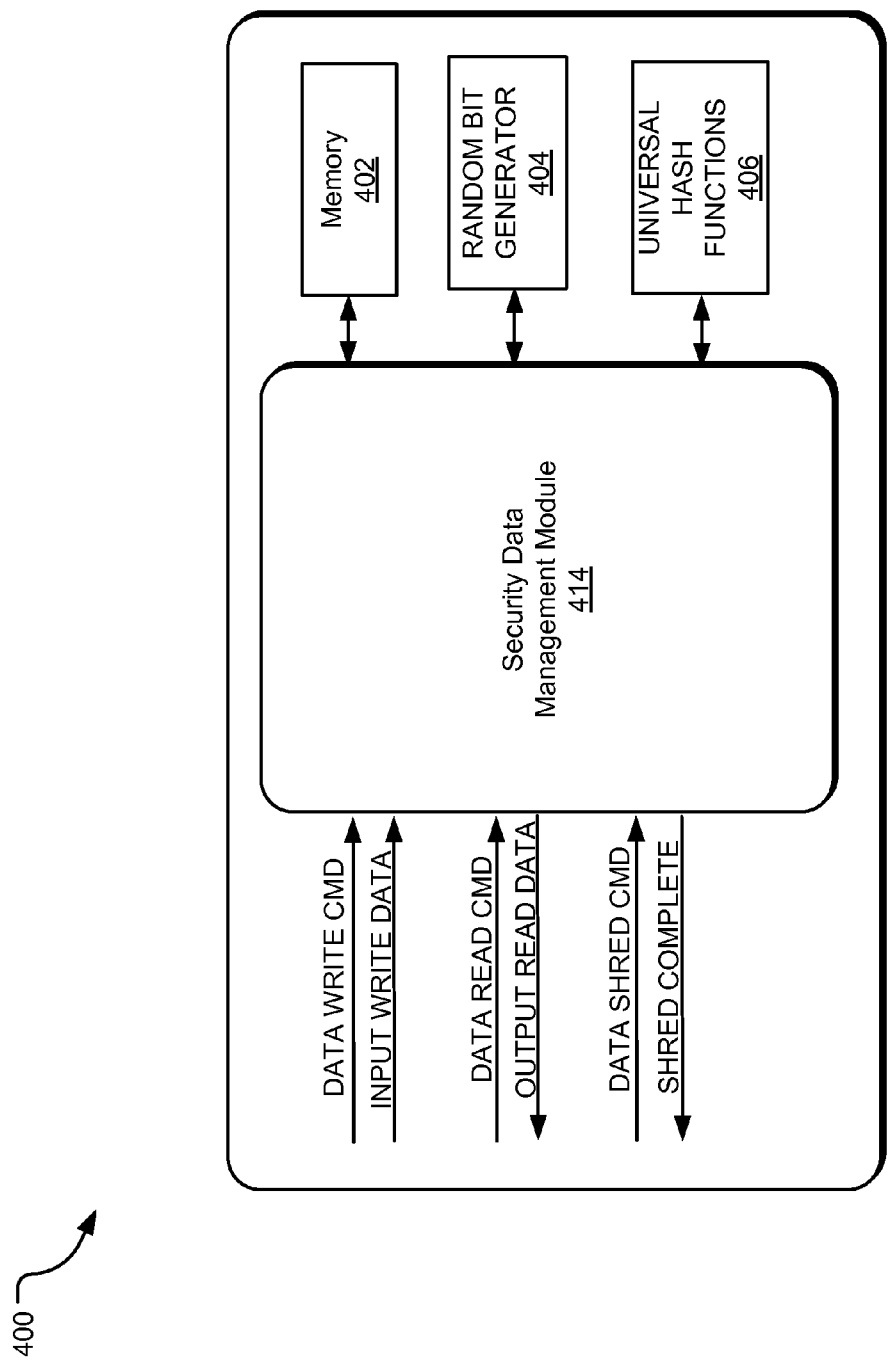
FIG. 4 illustrates an example storage system including a security data management module for implementing a data management scheme including secure read, secure write, and secure erase operations.

FIG. 4 illustrates an example system 400 including a security data management module 414 for carrying out data management commands in a manner that provides for successful data shredding of select data. The security data management module 414 generally operates to process secure write commands, secure read commands, and secure erase (also referred to herein as "secure shred") commands. The processing of secure write commands results in the writing of data to the memory 202; the processing of secure read commands results in the readback (recovery) of the previously written data from the memory 202; and the processing of secure erase commands results in the secure shredding of data written to the memory 202.

The shredding of data prevents, with a high degree of mathematical probability, the recovery of data from an associated memory 402. The memory 402 can correspond to any of the memories discussed above. The security data management module 414 operates in conjunction with a random bit generator 404 and a universal hash function module 406.

Figure 5A:
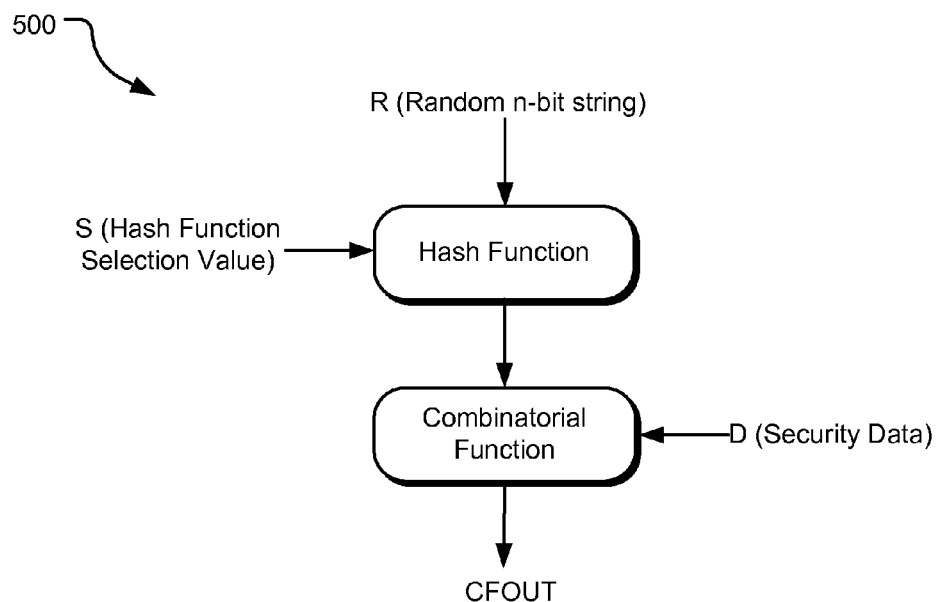
FIG. 5A illustrates encoding of security data during execution of an example secure write operation.
Figure 5B:
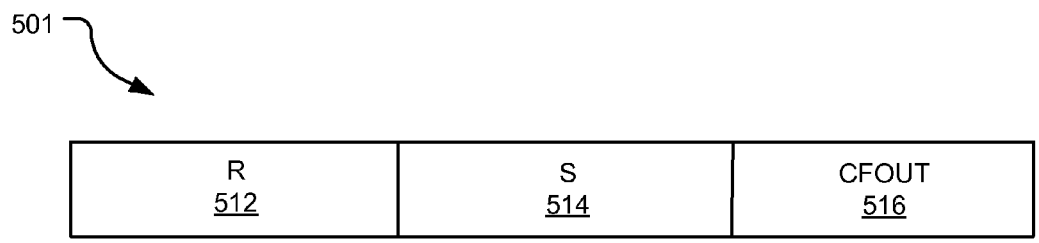
FIG. 5B illustrates writing of encoded security data to a storage medium during an example secure write operation.

In order to understand mechanisms employed by the security data management module 414, reference is made to FIGS. 5A and 5B, which illustrate aspects of one example secure write operation 500. Prior to the illustrated secure write operation, a data classification module (e.g., 316 in FIG. 3) determines that data "D" includes security data. The data classification module delegates a write operation of the data 'D' to the security data management module (e.g., the security data management module 414 in FIG. 4).

FIG. 5A illustrates encoding of the security data D according to an example secure write operation. In one implementation, the security data D represents a multi-bit string of logical values that may be securely stored in a non-volatile memory. The value R is a multi-bit random string of length n, generated by a random bit generator. The value S is a selection value represented as a random sequence that identifies a selected one of multiple available hash functions in a universal family of hash functions.

As it may be recognized by those skilled in the art, a family of hash functions can be classified as universal if, for every unique function in the family, the probability of the output of that hash function for a first input being equal to the output of another hash function for a second input is less than a defined mathematical constraint. A variety of universal hash functions are known in the art, and any number are suitable for use by a security data management module that performs encoding and secure data shredding operations.

The selected hash function is applied to the input random string R (e.g., a shredding key) to produce a hash output value $H_s(R)$. The hash output value is then combined with the security data D using a selected combinatorial function, such as but not necessarily limited to an exclusive-or (XOR) function. The output of the combinatorial function is denoted as CFOUT.

FIG. 5B illustrates recording of encoded security data (CFOUT) to a storage media during execution of an example secure write operation. The encoded security data CFOUT is included in a data structure 501 recorded to a non-volatile memory by a security data management module (e.g., the security data management module 414 of FIG. 4). The data structure 501 includes the R bits in a first memory location 512, the S bits in a second memory location 514 and the CFOUT bits in a third memory location 516. The respective locations 512, 514, and 516 can be immediately adjacent, such as in a single data block (e.g., a data sector) or a single row of data cells in a selected erasure block of a solid state storage device. Alternatively, the respective locations 512, 514, and 516 can be distributed to different non-adjacent locations in memory. Although not shown, standard error detection and correction (EDC) type codes can be generated and also stored to protect the respective R, S, and CFOUT values against bit errors during subsequent processing.

According to one implementation, a storage device includes one or more other data management modules in addition to the security data management module. The other data management modules are configured to write data to the same storage medium via a series of processing operations different from those illustrated in FIGS. 5A and 5B. For example, the data may be stored unencrypted, or encrypted according to a different encryption scheme.

Figure 6:
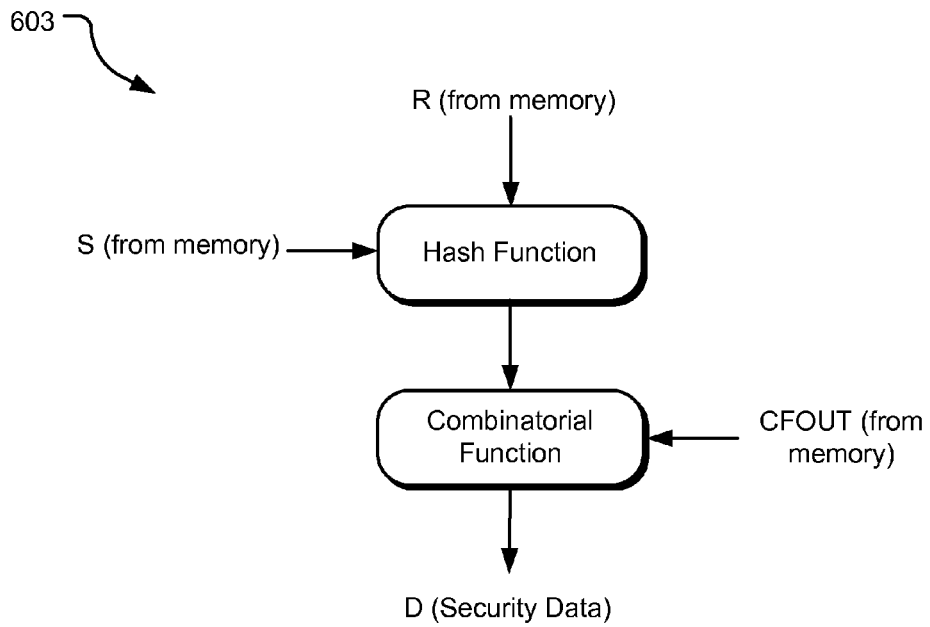
FIG. 6 illustrates reading of security data during an example secure read operation.

FIG. 6 illustrates an example secure read operation to recover security data 'D' encoded (e.g., as CFOUT) in a data structure (e.g., the data structure 501 of FIG. 5). Prior to the illustrated secure read operation, a data classification module (e.g., 316 in FIG. 3) determines that the data "D" requested by a device controller is security data. Accordingly, the task of reading the data 'D' is delegated to a security data management module, which executes the read operation according to a non-nominal set of processing operations (e.g., a secure read).

During the secure read operation, the security data management module reads respective R, S, and CFOUT values from memory. The S value is used to identify the selected hash function $H_s$, and the selected hash function is applied to the R value to regenerate the hash output value $H_s(R)$. The selected combinatorial function (e.g., XOR, etc.) is used to combine the hash output value $H_s(R)$ with the CFOUT value to recover the security data D.

Figure 7:
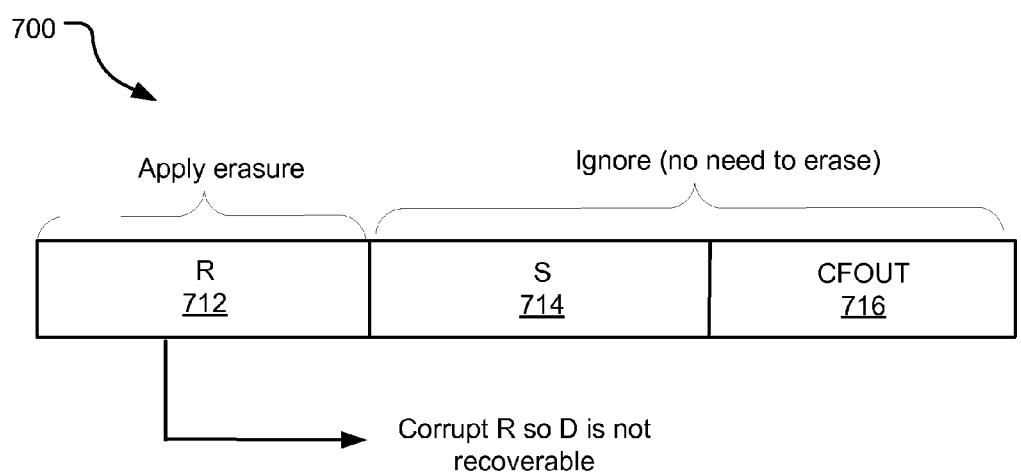
FIG. 7 illustrates erasing security data during an example secure erase operation.

FIG. 7 illustrates an example secure erase operation 700 that securely shreds stored security data ('D') from the storage medium. During the secure erase operation 700, a random N-bit string 'R' (used in encoding the data D and saved along with the encoded data D), is erased. Based solely on the corruption of the R data bits, the original secret data D cannot be successfully recovered. This result is true even if some of the bits in R are not altered at all or if a partial rather than a full erasure is applied to some of the R bits during the shredding operation 605. According to at least one implementation, the S and CFOUT data bits are not erased in the memory locations 614, 616. Because of the use of the hash function, the hash output value cannot be reconstructed and the security data D appears random to an attacking party. Hence, a single erasure operation upon R is, in one implementation, sufficient to shred D, although a multi-sequence erasure, including overwrite with random or cyclical data patterns, can be applied to the R bits as desired.

According to one implementation, a storage device includes one or more other data management modules in addition to the security data management module. The other data management modules are configured to read and erase data on the same storage medium via a series of processing operations different from those illustrated in FIGS. 6 and 7. For example, another data management scheme may read data via a different scheme, or erase data by merely re-programming the memory cells storing the data without the "secure shred" described above.

By storing all of the R bits in a single block, there is a risk that the particular physical block in which the R bits are stored will be subjected to a physical block failure and therefore the system cannot erase the R bits. Accordingly, further embodiments employ secret sharing techniques that divide up the random bits in R and distribute these to different memory blocks.

Figure 8:
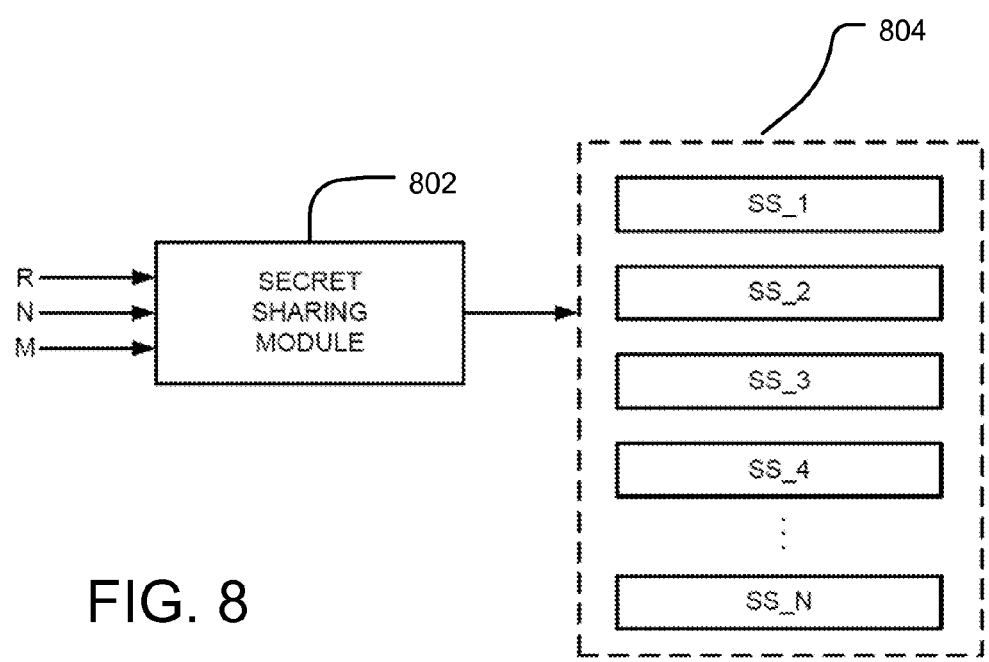
FIG. 8 shows a secret sharing module operable in some embodiments to carry out secret sharing upon a random sequence.

FIG. 8 illustrates a secret sharing module 802 operable in some embodiments to carry out secret sharing upon a random sequence R. Those skilled in the art will recognize that secret sharing constitutes a data transformation approach where a secret is divided up into a selected number of parts, or shares, and the shares are distributed to different recipients (e.g., memory locations, etc.). A selected algorithm is used to configure the secrets so that a selected subset of the shares are required in order to reconstitute the entire secret.

Stated another way, if the plural number N represents the total number of shares (subblocks), and M is the selected threshold number less than N, then the recovery of at least M subblocks is sufficient to reconstitute the contents of the original secret, and M−1 subblocks is insufficient to enable reconstitution of the contents of the original secret.

A variety of well-known secret sharing techniques can be used by the secret sharing module 802 based on input values of R, N and M. As shown in FIG. 8, the secret sharing module 802 generates a data set 804 with N separate shares SS_1 to SS_N. Each of the shares is stored in a different physical block of memory.

To read the protected data, the shares are recovered and processed by the secret sharing module 802 to return the original sequence R, and then the recovered sequence R is used as discussed above to reveal the secret. To shred the protected data, at least N−M+1 of the shares are subjected to erasure. It is contemplated that all of the shares will be subjected to erasure, but at least N−M+1 of the shares need to have been altered by the erasure process in order to successfully shred the secret data. Depending on the relative values of N and M, this provides a highly effective way to ensure that the data are in fact shredded since many block failures will be necessary to prevent the corruption of R.

Figure 9:
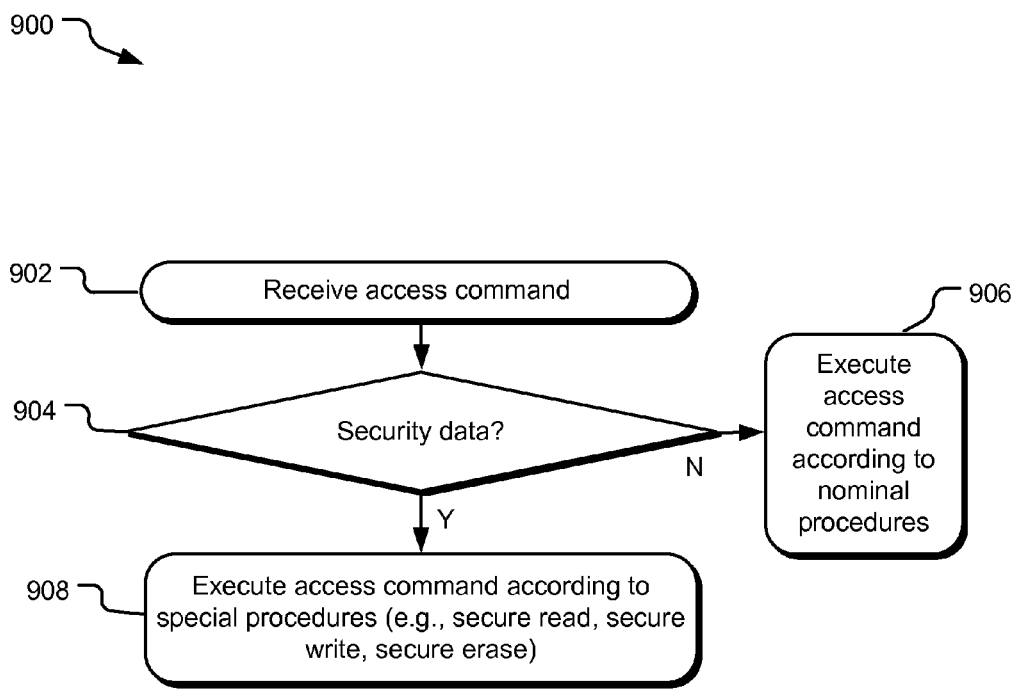
FIG. 9 illustrates operations selectively implementing one or more data management schemes to execute a memory access command.

FIG. 9 illustrates example operations 900 for selectively implementing one or more data management techniques. A receiving operation 902 receives an access command including an instruction to access data on stored in or addressed to a target data block on a storage medium. A determining operation 904 determines whether the data is security data by interpreting a data type identifier associated with the data. In one implementation, the data type identifier is the logical block address of the target data block. For example, security data may be stored and managed within a first LBA range on a storage medium and non-security data may be stored and managed within a second LBA range on the storage medium.

In another implementation, the data type identifier is a flag included in a header of an incoming data packet received with the write command. In yet another implementation, the data type identifier is a flag stored in association with the data on the storage medium. For example, the data may be read from a first data block and re-written to another data block of the storage medium. The first data block may store a data type identifier along with the data.

If the data type identifier indicates that the data is not security data, an execution operation 906 executes the access command according to a set of nominal (e.g., default) procedures. If the data type identifier indicates that the data is security data, another execution operation 908 executes the access command according to security procedures. "Security" procedures may entail, for example, reading, writing, and/or erasing data so as to allow for enhanced data protection (e.g., integrity) and/or security. In one implementation, execution of the access command via either the execution operation 906 or the execution operation 908 entails managing (e.g., reading, writing, erasing) data on a same storage medium, such as a common magnetic disk or flash data block.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
receiving a memory access command specifying a target data block in a storage medium storing both security data and non-security data;
determining whether data affected by the memory access command is security data; and
responsive to the determination operation, selecting one of multiple data management schemes to implement the memory access command, wherein each of the multiple data management schemes is adapted to implement the memory access command via a different series of processing operations and offer a different level of security protection for the data affected by the memory access command, the multiple data management schemes including:
a non-security data management scheme that implements a nominal erase command to overwrite the data affected by the memory access command; and
a security data management scheme that implements a secure erase command to shred the data affected by the memory access command, the secure erase command executable to erase a random string used in encoding the data in the target data block without erasing the data from the storage medium.

2. The method of claim 1, wherein the security data management scheme further implements each of a secure read command and a secure write command; and the non-security data management scheme further implements each of a nominal read command and a nominal write command.

3. The method of claim 1, wherein the determining operation is based on a logical block address of the target data block.

4. The method of claim 1, wherein the determining operation is based on information included in a data packet header saved or received in association with the data affected by the memory access command.

5. The method of claim 1, wherein the memory access command is a write command and the method further comprises:
writing the data affected by the memory access command with a first redundancy if the data is not security data and writing the data the data affected by the memory access command with a second, increased redundancy if the data is security data.

6. The method of claim 1, wherein the memory access command is a write command, the data affected by the memory access command is security data, and the method further comprises:
logically combining the data affected by the memory access command with a random string of numbers using a combinatorial logic function; and
storing the logically combined data and the random string of numbers on the storage medium.

7. The method of claim 1, wherein the data affected by the memory access command is security data, the memory access command is an erase command, and the method further comprises
securely shredding the data affected by the memory access command.

8. An apparatus comprising:
memory;
a data classification module stored in the memory that determines whether command data affected by a memory access command is security data;
a first data management module stored in the memory that executes the memory access command on a storage medium if the command data is security data, the first data management module configured to implement a secure erase command that shreds the command data by erasing a random string used in encoding the command data without erasing the command data from the storage medium; and
a second data management module stored in the memory that executes the memory access command on the storage medium according to a second, different set of processing operations if the command data is not security data, wherein the second data management scheme is configured to implement a nominal erase command that offers a decreased level of security protection for the command data as compared to the secure erase command of the first data management scheme.

9. The apparatus of claim 8, wherein the first data management module implements at least one of a secure read command and a secure write command that is not implemented by the second data management module.

10. The apparatus of claim 8, wherein the data classification module determines whether the command data is security data based on a logical block address of the command data.

11. The apparatus of claim 8, wherein the data classification module determines whether the command data is security data based on information in a data packet header saved or received in association with the command data.

12. The apparatus of claim 8, wherein the data classification module determines whether the command data is security data based on information saved in a same data block of the storage medium as the command data.

13. The apparatus of claim 8, wherein the memory access command is an erase command and the first data management module is configured to securely shred the command data.

14. A method comprising:
selecting, via a processor, one of multiple data management schemes for executing a memory access command based on an identifier associated with command data to be written to, read from, or erased from a storage medium by the memory access command, wherein the identifier indicates whether the command data is security data or non-security data and the multiple data management schemes include at least:
a security data management scheme that implements a secure write command that logically combines the data affected by the memory access command with a random string of numbers using a combinatorial logic function and stores the logically combined data and the random string of numbers on the storage medium.

15. The method of claim 14, further comprising
determining whether the command data is security data is based on information in a data packet header saved or received in association with the command data.

16. The method of claim 14, wherein the security data management scheme also implements each of a secure read command and a secure erase command, and the multiple data management schemes further include:
a non-security data management scheme that implements each of a nominal read command, a nominal write command, and a nominal erase command.

17. The method of claim 2, wherein the security data management scheme is configured to:
execute the secure read command by writing a random string to the storage medium along with an encoded copy of the security data;

execute the secure write command by reading the random string to the storage medium along with the encoded copy of the security data; and execute the secure erase command by erasing the random string.

18. The apparatus of claim 9, wherein the first security data management scheme is configured to:

execute the secure read command by writing a random string to the storage medium along with an encoded copy of the security data;

execute the secure write command by reading the random string to the storage medium along with the encoded copy of the security data; and execute the secure erase command by erasing the random string.

\* \* \* \* \*